United States Patent
Böhm et al.

(10) Patent No.: US 7,717,681 B2
(45) Date of Patent: May 18, 2010

(54) LEAK DETECTOR COMPRISING A VACUUM APPARATUS

(75) Inventors: Thomas Böhm, Köln (DE); Ulrich Doebler, Wermelskirchen (DE); Ralf Hirche, Köln (DE); Werner Grosse Bley, Bonn (DE)

(73) Assignee: Inficon GmbH (DE)

( * ) Notice: Subject to any disclaimer, the term of this patent is extended or adjusted under 35 U.S.C. 154(b) by 424 days.

(21) Appl. No.: 10/553,457

(22) PCT Filed: Apr. 8, 2004

(86) PCT No.: PCT/EP2004/003789

§ 371 (c)(1),
(2), (4) Date: Oct. 17, 2005

(87) PCT Pub. No.: WO2004/097363

PCT Pub. Date: Nov. 11, 2004

(65) Prior Publication Data

US 2006/0280615 A1  Dec. 14, 2006

(30) Foreign Application Priority Data

May 2, 2003  (DE) .............................. 103 19 633

(51) Int. Cl.
*F04B 25/00* (2006.01)

(52) U.S. Cl. ...................... 417/248; 73/40.7

(58) Field of Classification Search ................ 417/248, 417/279–311; 73/40.7, 40

See application file for complete search history.

(56) References Cited

U.S. PATENT DOCUMENTS

| 3,520,176 | A | * | 7/1970 | Becker ........................ 73/40.7 |
| 4,225,288 | A | * | 9/1980 | Mugele et al. ................. 417/2 |
| 4,505,647 | A | * | 3/1985 | Alloca et al. ................. 417/252 |
| 4,919,599 | A |   | 4/1990 | Reich et al. |
| 5,585,548 | A | * | 12/1996 | Grosse Bley et al. ......... 73/40.7 |
| 5,703,281 | A | * | 12/1997 | Myneni ...................... 73/40.7 |
| 5,944,049 | A | * | 8/1999 | Beyer et al. .............. 137/487.5 |

FOREIGN PATENT DOCUMENTS

EP    0 283 543    9/1988

* cited by examiner

*Primary Examiner*—Devon C Kramer
*Assistant Examiner*—Dnyanesh Kasture
(74) *Attorney, Agent, or Firm*—Marjama Muldoon Blasiak & Sullivan LLP

(57) ABSTRACT

A leak detector operating according to the counterflow principle comprises a first high vacuum pump that operates in series with a primary pump. A second high vacuum pump is branched at a connecting point and an entry side thereof is connected to a mass spectrometer. A light test gas in the form of helium flows through the second high vacuum pump in a direction opposite to a transport direction. A conduit connecting an inlet to the entry side of the first high vacuum pump is devoid of restricted flow zones and valves in such a way that the pumping capacity of the leak detector is high for helium, thereby reducing the response time thereof. A valve for blocking the conduit leading via the first high vacuum pump is arranged between the exit side thereof and the entry side of the primary pump.

4 Claims, 1 Drawing Sheet

LEAK DETECTOR COMPRISING A VACUUM APPARATUS

BACKGROUND OF THE INVENTION

The invention relates to a leak detector operating according to the counterflow principle and comprising a first high vacuum pump the entry side of which is connected to the inlet of the leak detector, a second high vacuum pump the entry side of which is connected to a mass spectrometer, a primary pump the entry side of which is connected to the exit sides of the two high vacuum pumps, and a bypass connecting the inlet of the leak detector to the primary pump and including a first valve.

A leak detector of this kind is described in EP 0 283 543 A1. It serves to detect leaks in a vacuum-tight apparatus. To this end, a light test gas is introduced into the apparatus to be tested and this apparatus is placed in a vacuum-tight room from which the available gas is sucked off. Alternatively, test gas can be sprayed from outside onto a test piece the interior volume of which is connected to the inlet of the leak detector. In the sucked-off gas, constituents of the test gas can be detected by a mass spectrometer and be evaluated. If there are test gas portions, this suggests a leak in the apparatus. The leak detector according to the counterflow principle referred to comprises a primary pump and a first high vacuum pump which are operated in series. A second high vacuum pump connects the mass spectrometer to the entry side of the primary pump. In a suction stage, the way via the first high vacuum pump is blocked by closing a valve arranged upstream of this pump and the container including the test piece is pumped dry via a bypass including a valve. When the pressure in the container has decreased below a value of about 100 mbar, a throttle valve in the conduit leading to the first high vacuum pump is opened so that test gas may flow through the first high vacuum pump. If, in the course of this, test gas (helium) enters into the conduit system, it enters into the second high vacuum pump in the counterflow and through the latter into the mass spectrometer. If helium has not been detected by the mass spectrometer in this stage, a further leak detection with higher sensitivity is started by releasing the connection of the test piece to the first high vacuum pump through another valve of a large nominal diameter. The pre-evacuation valve in the bypass is closed then. Thereafter, the test piece is evacuated to a pressure of about $10^{-4}$ mbar, leakage rates in the order of about $10^{-5}$ to $10^{-10}$ mbar l/s being detectable.

Because of the valves arranged in front of the entry side of the first high vacuum pump, this pump is able to operate continuously at full speed under vacuum conditions. The valves arranged upstream, however, have a flow resistance and thus a throttling effect. Therefore, the full suction capacity of the high vacuum pump is not available at the test connection in a non-throttled manner. Particularly, the helium suction capacity of the high vacuum pump cannot be utilized to the full extent thereof which would be convenient to achieve minimum response times.

SUMMARY OF THE INVENTION

It is the object of the invention to provide a leak detector according to the counterflow principle, which has an increased suction capacity for helium at the inlet and thus short response times so that the search for leaks is shortened.

Accordingly, according to the invention, the first high vacuum pump is connected to the inlet of the leak detector directly and without any valve. A second valve—apart from the first valve included in the bypass—is provided between the exit side of the first high vacuum pump and the primary pump.

In comparison with the described state of the art, the invention offers a number of advantages. There is no valve in front of the inlet of the first high vacuum pump. Consequently, this pump stands still at the beginning of a pumping cycle and is either started simultaneously with the opening of the first valve included in the bypass or a little bit later when the pressure has already decreased. At the test connection, i.e., at the inlet of the leak detector, the full suction capacity of the first high vacuum pump is available in a non-throttled manner as soon as the pressure has fallen below the maximum intake pressure of this pump. Thus, the full helium suction capacity is particularly available to achieve minimum response times. The detection sensitivity is not impaired since it is independent of the suction capacity and the inlet pressure of the first high vacuum pump. The helium leakage gas flow is always equivalent to the flow emerging from the leak.

The mentioned second valve has two possible operating modes. In the first operating mode, the first and the second valves are opened simultaneously with the start of the first high vacuum pump. Both the primary pump and second high vacuum pump are on when the first high vacuum pump is turned on. This results in a maximum suction capacity of the primary pump through the first high vacuum pump and the bypass extending parallel thereto, which results in minimum pump-out time. In the second operating mode, the second valve remains closed for the moment until the pressure has left the viscous flow range which happens at approximately 0.1 to 1 mbar. Only then is the first high vacuum pump started and simultaneously, the second valve is opened. Again, both the primary pump and second high vacuum pump are on when the first high vacuum pump is turned on. This operating mode offers an optimum protection from dirt from the test piece since it is pumped through the bypass and does not enter the first high vacuum pump.

Preferably, the first high vacuum pump is arranged in horizontal operating mode so that no particles are able to fall straight into its entry side. If the primary pump is a pump sealed with oil, e.g., a rotary valve pump, the test connection is optimally protected from oil reflux in the end pressure range.

Hereinafter, an embodiment of the invention is explained in detail with reference to the attached drawing.

DETAILED DESCRIPTION

Figure 1:
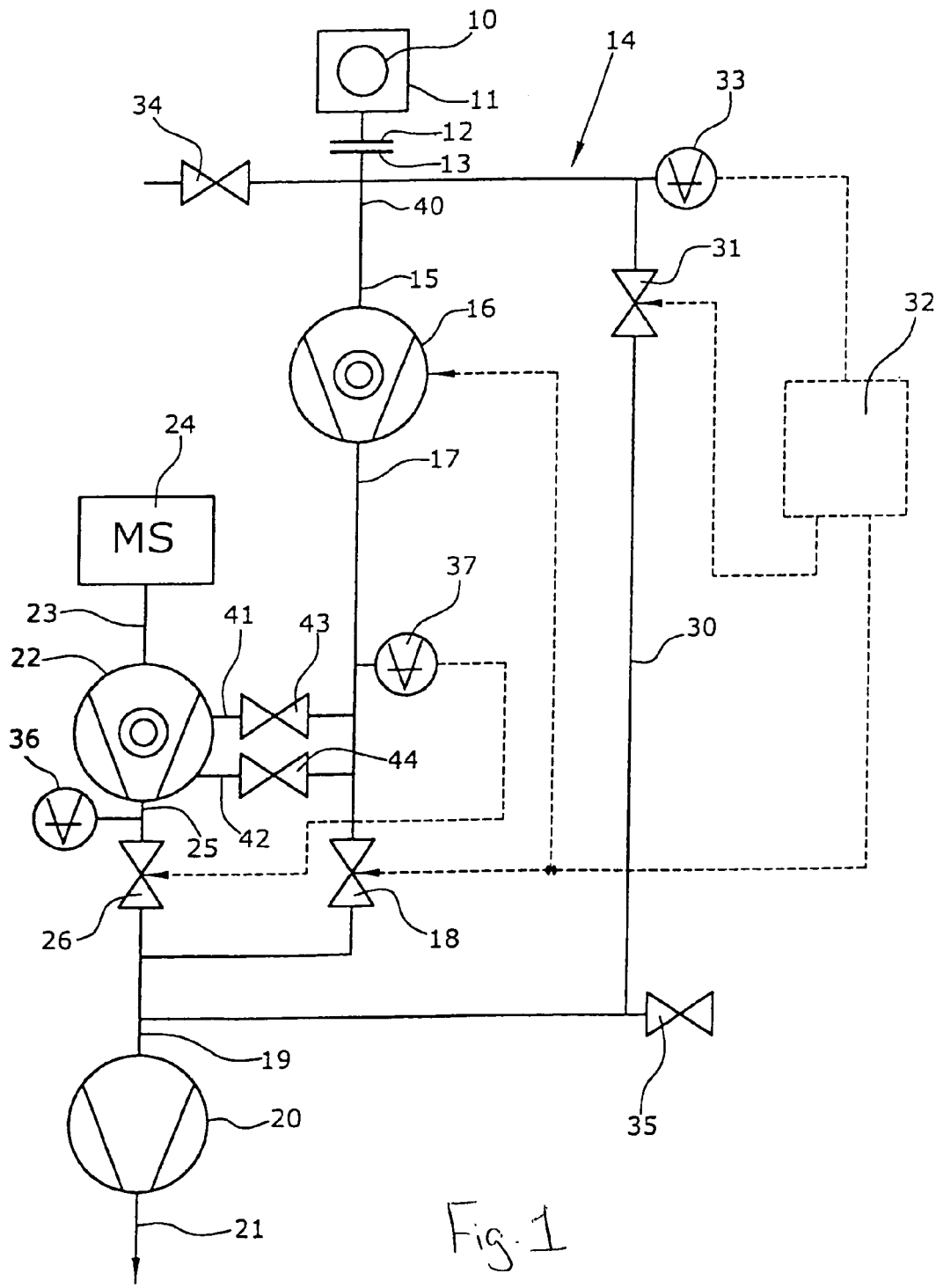
FIG. 1 depicts a basic circuit diagram of the leak detector according to the present invention.

The test piece 10 to be tested for leaks is filled with a test gas, typically helium, and inserted into a vacuum-tight test chamber 11. In the test chamber 11, a vacuum is generated by suction, and the gas leaving the test chamber is tested for helium portions.

To a connection 12 of the test chamber 11, the inlet 13 of the leak detector 14 is connected. The entry side 15 of a high vacuum pump 16 is connected with the inlet 13. Within the scope of the present specification and the claims, a high vacuum pump is a molecular pump. A molecular pump exerts pulses upon gas molecules and accelerates them. Consequently, the molecular pump operates only at very low pressures, the outlet pressure on the pressure side amounting to only a few mbar. A typical high vacuum pump is a turbomolecular pump comprising numerous stator discs and rotor discs, the rotor discs rotating at a high speed. A molecular pump generates a high compression for heavy molecules only, but a low compression for light molecules. A molecular pump has a different suction capacity for each gas. For the light gas helium, the suction capacity is especially low.

The exit side 17 of the high vacuum pump 16 is connected with the entry side 19 of a primary pump 20 via a valve 18 yet to be explained. The exit side 21 of the primary pump leads into the atmosphere. The primary pump 20 is a positive-displacement pump, e.g., which generates the low pressure required for the operation of the high vacuum pump 16.

With its entry side 23, a second high vacuum pump 22 is connected with a mass spectrometer 24 suitable for detecting the test gas helium. Via a valve 26, the exit side 25 of the second high vacuum pump 22 is connected with the entry side of the primary pump 20.

The test gas is a light gas passing the high vacuum pump 22 in counterflow, i.e., in opposite direction to the direction of delivery, and reaches the mass spectrometer 24.

Further, the leak detector comprises a bypass 30 connecting the inlet 13 with the entry side 19 of the primary pump 20 and including a first valve 31 so that it can be optionally opened and blocked.

A control 32 controls the first valve 31 and the second valve 18 connected with the exit side 17 of the high vacuum pump 16 in dependence on the pressure at the inlet 13 which is measured by a pressure gauge 33. Further, the inlet 13 is connected to the atmosphere via a ventilation valve 34. Likewise, the entry side 19 of the primary pump 20 is connected to the atmosphere via a ventilation valve 35.

The pressure at the exit side 25 of the second high vacuum pump 22 is measured by a pressure gauge 36. Another pressure gauge 37 is connected with the exit side 17 of the first high vacuum pump 16. In dependence on the measured pressure, the valve 26 is opened when the pressure falls below a predetermined value.

The substantial feature of the invention consists in that the conduit 40 connecting the inlet 13 with the entry side 15 of the first high vacuum pump 16 is completely non-throttled and neither includes a restricted flow zone nor a valve. Thus, the complete suction capacity of the high vacuum pump 16 is available at the inlet 13 as soon as the pressure falls below the maximum suction pressure of the high vacuum pump. Thereby, the shortest response times for the test gas helium are achieved.

The conduit branch including the first high vacuum pump 16 is blocked by the second valve 18.

In the first operating mode, the valves 31 and 18 are opened simultaneously with the start of the first high vacuum pump 16. Both the primary pump 20 and second high vacuum pump 22 are on when the first high vacuum pump is turned on. Thereby, a minimum pump-out time is achieved by a maximum suction capacity of the primary pump 20, both through the first high vacuum pump 16 and through the bypass 30.

In the second operating mode, the valve 18 first remains closed until the pressure at the inlet 13 has fallen below a limit value of about 0.1 to 1 mbar, which represents the limit of the viscous flow range. Only when the signal of the pressure gauge 33 indicates that the pressure has fallen below the limit value, the first high vacuum pump 16 is started, and simultaneously, the second valve 18 is opened. Both the primary pump 20 and second high vacuum pump 22 are on when the first high vacuum pump is turned on. In this operating mode, the first high vacuum pump 16 is protected from dirt from the test piece during the pumping out of the gas since the gas is exclusively led through the bypass 30.

The second high vacuum pump 22 comprises two intermediate inlets 41 and 42 each of which is connected to the exit side 17 of the first high vacuum pump 16 via switchable valves 43 and 44, respectively. By switching these valves, the measuring range can be changed. Hereinafter. examples for pressures at characteristic sites of the high vacuum pump 22 are set forth:

exit side 25: 15 mbar
intermediate inlet 42: 1 mbar
intermediate inlet 41: $10^{-2}$ mbar
entry side 23: $10^{-4}$ mbar.

The invention claimed is:

1. Leak detector according to the counterflow principle, comprising:
   a first high vacuum pump having an entry side that is connected to an inlet of the leak detector;
   a second high vacuum pump having an entry side which is connected to a mass spectrometer;
   a primary pump having an entry side which is connected to exit sides of the first and second high vacuum pumps;
   a bypass connecting the inlet of the leak detector to the primary pump and including a first valve, wherein the first high vacuum pump is connected to the inlet of the leak detector in a non-throttled manner and without valving, and wherein a second valve is directly connected to the exit side of the first high vacuum pump and is between the exit side of the first high vacuum pump and the primary pump and is controlled in response to the pressure at the inlet of the leak detector; and
   a third valve connecting an exit side of the second high vacuum pump with the entry side of the primary pump, said third valve being controlled in dependence on the pressure on the exit side of the first high vacuum pump.

2. Leak detector according to claim 1, wherein the first high vacuum pump is started simultaneously with the opening of the second valve upon opening the first valve.

3. Leak detector according to claim 1, wherein the first high vacuum pump is activated only after the first valve has been opened when the pressure at the inlet has left the viscous flow range or fallen below a limit value.

4. Leak detector according to claim 1, wherein the second high vacuum pump further comprises at least one intermediate inlet connected to the exit side of the first high vacuum pump via a valve, said valve being dependently controlled based upon the pressure of the exit side of the first high vacuum pump.

* * * * *